(12) United States Patent
Kerr et al.

(10) Patent No.: US 10,721,705 B1
(45) Date of Patent: Jul. 21, 2020

(54) CONTENT RELEVANCE WEIGHTING SYSTEM

(75) Inventors: Michael A. Kerr, Reno, NV (US); David Stewart, Reno, NV (US)

(73) Assignee: NEXRF CORP., Reno, NV (US)

( * ) Notice: Subject to any disclaimer, the term of this patent is extended or adjusted under 35 U.S.C. 154(b) by 1654 days.

(21) Appl. No.: 13/251,735

(22) Filed: Oct. 3, 2011

Related U.S. Application Data

(63) Continuation-in-part of application No. 13/218,256, filed on Aug. 25, 2011, now Pat. No. 10,430,492, and
(Continued)

(51) Int. Cl.
*G06Q 30/00* (2012.01)
*H04W 64/00* (2009.01)
(Continued)

(52) U.S. Cl.
CPC ........... *H04W 64/00* (2013.01); *G01S 5/0252* (2013.01); *G06Q 30/0233* (2013.01); *G06Q 30/0261* (2013.01); *G06Q 30/0267* (2013.01); *G07F 17/3218* (2013.01); *G07F 17/3239* (2013.01); *G07F 17/3255* (2013.01);
(Continued)

(58) Field of Classification Search
CPC ......... H04W 64/00; H04W 4/20; H04W 4/80; H04W 4/33; H04W 4/02; H04W 64/003; H04W 4/021; H04B 17/27; H04B 17/318; G06Q 30/0261; G06Q 30/0267; G06Q 30/0233; G01S 5/0252; G07F 17/3239; G07F 17/3218; G07F 17/3255; H04L 67/306; G06F 17/00
See application file for complete search history.

(56) References Cited

U.S. PATENT DOCUMENTS

| | | |
|---|---|---|
| 4,339,798 A | 7/1982 | Hedges et al. |
| 4,856,787 A | 8/1989 | Itkis |

(Continued)

FOREIGN PATENT DOCUMENTS

| | | |
|---|---|---|
| JP | 2009025019 A | 2/2009 |
| WO | 2008065257 A1 | 6/2008 |
| WO | WO2008065257 A1 | 6/2008 |

OTHER PUBLICATIONS

"Location aggregation from multiple sources". Myllymaki . IEEE XPLORE. Jan. 1, 2002. (Year: 2002).*

(Continued)

*Primary Examiner* — Maria V Vanderhorst
(74) *Attorney, Agent, or Firm* — Kerr IP Group, LLC

(57) ABSTRACT

A system for adjusting a relevance weight value for a content item is described. The system comprises a content delivery module configured to deliver a plurality of content items to a device via a network. The content items are displayed on the device. A user provides a feedback input that is a positive review or a negative review for a content item. The feedback input is transmitted to a relevance weight adjustment module that subtracts a first point value from the relevance weight value associated with a first set of users when a negative review is received for the content item and adds a first point value to the relevance weight value associated with a first set of users when a positive review is received for the content item.

17 Claims, 10 Drawing Sheets

Related U.S. Application Data a continuation-in-part of application No. 13/153,214, filed on Jun. 3, 2011, now Pat. No. 9,507,494, and a continuation-in-part of application No. 13/153,238, filed on Jun. 3, 2011, now Pat. No. 9,408,032, and a continuation-in-part of application No. 13/153,248, filed on Jun. 3, 2011, now Pat. No. 9,615,347.

(60) Provisional application No. 61/472,054, filed on Apr. 5, 2011, provisional application No. 61/427,753, filed on Dec. 28, 2010, provisional application No. 61/427,755, filed on Dec. 28, 2010, provisional application No. 61/454,664, filed on Mar. 21, 2011, provisional application No. 61/482,834, filed on May 5, 2011, provisional application No. 61/376,936, filed on Aug. 25, 2010, provisional application No. 61/351,677, filed on Jun. 4, 2010, provisional application No. 61/351,770, filed on Jun. 4, 2010, provisional application No. 61/352,242, filed on Jun. 7, 2010.

(51) Int. Cl.
*H04B 17/27* (2015.01)
*H04B 17/318* (2015.01)
*G01S 5/02* (2010.01)
*G06Q 30/02* (2012.01)
*G07F 17/32* (2006.01)
*H04W 4/021* (2018.01)
*G05B 19/418* (2006.01)
*H04L 29/08* (2006.01)

(52) U.S. Cl.
CPC ........... *H04B 17/27* (2015.01); *H04B 17/318* (2015.01); *H04W 4/021* (2013.01); *H04L 67/306* (2013.01)

(56) References Cited

U.S. PATENT DOCUMENTS

| | | |
|---|---|---|
| 5,586,937 A | 12/1996 | Menashe |
| 5,594,491 A | 1/1997 | Hodge et al. |
| 5,630,757 A | 5/1997 | Gagin et al. |
| 5,643,086 A | 7/1997 | Alcorn et al. |
| 5,738,583 A | 4/1998 | Comas et al. |
| 5,761,416 A | 6/1998 | Mandal et al. |
| 5,761,647 A | 6/1998 | Boushy |
| 5,762,552 A | 6/1998 | Vuong et al. |
| 5,768,382 A | 6/1998 | Schneier et al. |
| 5,779,545 A | 7/1998 | Berg et al. |
| 5,800,268 A | 9/1998 | Molnick |
| 5,851,149 A | 12/1998 | Xidos et al. |
| 5,871,398 A | 2/1999 | Schneier et al. |
| 5,902,983 A | 5/1999 | Crevalt et al. |
| 5,947,821 A | 9/1999 | Stone |
| 5,971,849 A | 10/1999 | Falciglia |
| 6,001,016 A | 12/1999 | Walker et al. |
| 6,010,404 A | 1/2000 | Walker et al. |
| 6,106,396 A | 8/2000 | Alcorn et al. |
| 6,142,876 A | 11/2000 | Cumbers |
| 6,159,095 A | 12/2000 | Frohm et al. |
| 6,178,510 B1 | 1/2001 | O'Connor et al. |
| 6,203,428 B1 | 3/2001 | Giobbi et al. |
| 6,259,405 B1 | 7/2001 | Stewart et al. |
| 6,322,446 B1 | 11/2001 | Yacenda |
| 6,327,535 B1 | 12/2001 | Evans et al. |
| 6,409,602 B1 | 6/2002 | Wiltshire et al. |
| 6,500,068 B2 | 12/2002 | Walker et al. |
| 6,508,709 B1 | 1/2003 | Karmarkar |
| 6,508,710 B1 | 1/2003 | Paravia et al. |
| 6,527,638 B1 | 3/2003 | Walker et al. |
| 6,554,705 B1 | 4/2003 | Cumbers |
| 6,575,834 B1 | 6/2003 | Lindo |
| 6,606,494 B1 | 8/2003 | Arpee et al. |
| 6,612,928 B1 | 9/2003 | Bradford et al. |
| 6,628,939 B2 | 9/2003 | Paulsen |
| 6,638,170 B1 | 10/2003 | Crumby |
| 6,640,218 B1 | 10/2003 | Golding et al. |
| 6,676,522 B2 | 1/2004 | Rowe |
| 6,682,421 B1 | 1/2004 | Rowe et al. |
| 6,702,672 B1 | 3/2004 | Angell et al. |
| 6,709,333 B1 | 3/2004 | Bradford et al. |
| 6,709,631 B2 | 3/2004 | Mori et al. |
| 6,719,631 B1 | 4/2004 | Tulley et al. |
| 6,749,512 B2 | 6/2004 | MacGregor et al. |
| 6,782,253 B1 | 8/2004 | Shteyn et al. |
| 6,834,195 B2 | 12/2004 | Brandenberg et al. |
| 6,875,110 B1 | 4/2005 | Crumby |
| 6,879,838 B2 | 4/2005 | Rankin et al. |
| 6,884,162 B2 | 4/2005 | Raverdy et al. |
| 6,942,574 B1 | 9/2005 | LeMay et al. |
| 7,035,651 B2 | 4/2006 | Schreiner et al. |
| 7,076,243 B2 | 7/2006 | Parupudi et al. |
| 7,107,245 B1 | 9/2006 | Kowalick |
| 7,136,915 B2 | 11/2006 | Rieger, III |
| 7,196,662 B2 | 3/2007 | Misikangas et al. |
| 7,209,752 B2 | 4/2007 | Myllymaki et al. |
| 7,213,048 B1 | 5/2007 | Parupudi et al. |
| 7,218,941 B1 | 5/2007 | Kubo et al. |
| 7,228,136 B2 | 6/2007 | Myllymaki et al. |
| 7,299,059 B2 | 11/2007 | Misikangas et al. |
| 7,338,372 B2 | 3/2008 | Morrow et al. |
| 7,341,522 B2 | 3/2008 | Yamagishi |
| 7,349,683 B2 | 3/2008 | Misikangas |
| 7,359,714 B2 | 4/2008 | Parupudi et al. |
| 7,397,424 B2 | 7/2008 | Houri |
| 7,450,954 B2 | 11/2008 | Randall |
| 7,493,565 B2 | 2/2009 | Parupudi et al. |
| 7,529,639 B2 | 5/2009 | Rasanen et al. |
| 7,534,169 B2 | 5/2009 | Amaitis et al. |
| 7,611,407 B1 | 11/2009 | Itkis et al. |
| 7,753,772 B1 | 7/2010 | Walker et al. |
| 8,002,617 B1 | 8/2011 | Uskela et al. |
| 8,029,349 B2 | 10/2011 | Lind |
| 8,172,684 B2 | 5/2012 | Adiraju et al. |
| 8,403,755 B2 | 3/2013 | Kerr |
| 8,492,995 B2 | 7/2013 | Maxik et al. |
| 8,506,406 B2 | 8/2013 | Kerr |
| 8,506,407 B2 | 8/2013 | Kerr |
| 8,523,679 B2 | 9/2013 | Kerr |
| 8,738,024 B1 | 5/2014 | Kerr et al. |
| 8,747,229 B2 | 6/2014 | Kerr |
| 8,942,995 B1 | 1/2015 | Kerr |
| 9,043,222 B1 | 5/2015 | Kerr et al. |
| 2001/0004768 A1 | 6/2001 | Hodge et al. |
| 2001/0005908 A1 | 6/2001 | Hodge et al. |
| 2001/0036224 A1 | 11/2001 | Demello et al. |
| 2001/0039210 A1 | 11/2001 | St-Denis |
| 2001/0044337 A1 | 11/2001 | Rowe et al. |
| 2002/0002073 A1 | 1/2002 | Montgomery et al. |
| 2002/0007494 A1 | 2/2002 | Hodge |
| 2002/0056125 A1 | 5/2002 | Hodge et al. |
| 2002/0056143 A1 | 5/2002 | Hodge et al. |
| 2002/0069105 A1 | 6/2002 | Botelho et al. |
| 2002/0077130 A1 | 6/2002 | Owensby |
| 2002/0077167 A1 | 6/2002 | Merari |
| 2002/0091568 A1 | 7/2002 | Kraft et al. |
| 2002/0103028 A1 | 8/2002 | Carter et al. |
| 2002/0111210 A1 | 8/2002 | Luciano et al. |
| 2002/0111907 A1 | 8/2002 | Ling |
| 2002/0133707 A1 | 9/2002 | Newcombe |
| 2002/0142815 A1 | 10/2002 | Candelore |
| 2002/0142844 A1 | 10/2002 | Kerr |
| 2002/0142846 A1 | 10/2002 | Paulsen |
| 2002/0144151 A1 | 10/2002 | Shell et al. |
| 2002/0174436 A1 | 11/2002 | Wu et al. |
| 2002/0198775 A1 | 12/2002 | Ryan |
| 2003/0009385 A1 | 1/2003 | Tucciarone et al. |
| 2003/0030666 A1 | 2/2003 | Najmi et al. |
| 2003/0032409 A1 | 2/2003 | Hutcheson et al. |
| 2003/0064805 A1 | 4/2003 | Wells |
| 2003/0119578 A1 | 6/2003 | Newson |

(56) References Cited

U.S. PATENT DOCUMENTS

| | | |
|---|---|---|
| 2003/0144017 A1 | 7/2003 | Inselberg |
| 2004/0023721 A1 | 2/2004 | Giobbi |
| 2004/0192438 A1 | 9/2004 | Wells et al. |
| 2004/0224757 A1 | 11/2004 | Yamamura et al. |
| 2005/0046608 A1 | 3/2005 | Schantz et al. |
| 2005/0048990 A1 | 3/2005 | Lauriol |
| 2005/0085257 A1 | 4/2005 | Laird et al. |
| 2005/0114212 A1 | 5/2005 | Carrez et al. |
| 2005/0136949 A1 | 6/2005 | Barnes |
| 2005/0154646 A1 | 7/2005 | Chermesino |
| 2005/0159883 A1 | 7/2005 | Humphries et al. |
| 2005/0181804 A1 | 8/2005 | Misikangas et al. |
| 2005/0246334 A1 | 11/2005 | Tao et al. |
| 2005/0261063 A1 | 11/2005 | Boyd et al. |
| 2006/0003830 A1 | 1/2006 | Walker et al. |
| 2006/0004627 A1 | 1/2006 | Baluja |
| 2006/0019679 A1* | 1/2006 | Rappaport ............ G01S 5/0252 455/456.5 |
| 2006/0058102 A1 | 3/2006 | Nguyen et al. |
| 2006/0063575 A1 | 3/2006 | Gatto et al. |
| 2006/0125693 A1 | 6/2006 | Recker |
| 2006/0181411 A1 | 8/2006 | Fast et al. |
| 2006/0189382 A1 | 8/2006 | Muir et al. |
| 2006/0194633 A1 | 8/2006 | Paulsen |
| 2006/0238382 A1 | 10/2006 | Kimchi et al. |
| 2006/0240891 A1 | 10/2006 | Klinkhammer et al. |
| 2006/0287810 A1 | 12/2006 | Sadri et al. |
| 2007/0008108 A1 | 1/2007 | Schurig et al. |
| 2007/0024580 A1 | 2/2007 | Sands et al. |
| 2007/0025265 A1 | 2/2007 | Porras et al. |
| 2007/0060306 A1 | 3/2007 | Amaitis et al. |
| 2007/0061229 A1 | 3/2007 | Ramer et al. |
| 2007/0087834 A1 | 4/2007 | Moser et al. |
| 2007/0100963 A1 | 5/2007 | Ban et al. |
| 2007/0136132 A1 | 6/2007 | Weiser et al. |
| 2007/0149215 A1 | 6/2007 | Misikangas |
| 2007/0149216 A1 | 6/2007 | Misikangas |
| 2007/0167210 A1 | 7/2007 | Kelly et al. |
| 2007/0168127 A1 | 7/2007 | Zaruba et al. |
| 2007/0184852 A1 | 8/2007 | Johnson et al. |
| 2007/0218975 A1 | 9/2007 | Iddings et al. |
| 2007/0243925 A1 | 10/2007 | LeMay et al. |
| 2007/0244633 A1 | 10/2007 | Phillips et al. |
| 2007/0257831 A1 | 11/2007 | Mathews et al. |
| 2007/0270212 A1 | 11/2007 | Cockerille et al. |
| 2007/0281692 A1 | 12/2007 | Bucher et al. |
| 2008/0026844 A1 | 1/2008 | Wells |
| 2008/0032705 A1 | 2/2008 | Patel et al. |
| 2008/0039192 A1 | 2/2008 | Laut |
| 2008/0057894 A1 | 3/2008 | Aleksic et al. |
| 2008/0076572 A1 | 3/2008 | Nguyen et al. |
| 2008/0085692 A1 | 4/2008 | Hart et al. |
| 2008/0096659 A1 | 4/2008 | Kreloff et al. |
| 2008/0097858 A1 | 4/2008 | Vucina et al. |
| 2008/0102947 A1 | 5/2008 | Hays et al. |
| 2008/0108430 A1 | 5/2008 | Evans |
| 2008/0113785 A1 | 5/2008 | Alderucci et al. |
| 2008/0153515 A1 | 6/2008 | Mock et al. |
| 2008/0162037 A1 | 7/2008 | Hasan |
| 2008/0166973 A1 | 7/2008 | Hart et al. |
| 2008/0167106 A1 | 7/2008 | Lutnick et al. |
| 2008/0186234 A1 | 7/2008 | Alles et al. |
| 2008/0189360 A1 | 8/2008 | Kiley et al. |
| 2008/0207296 A1 | 8/2008 | Lutnick et al. |
| 2008/0227473 A1 | 9/2008 | Haney |
| 2008/0249833 A1 | 10/2008 | Ali et al. |
| 2008/0252527 A1 | 10/2008 | Garcia |
| 2008/0281668 A1 | 11/2008 | Nurminen |
| 2009/0018929 A1 | 1/2009 | Weathers |
| 2009/0150217 A1 | 6/2009 | Luff |
| 2009/0197684 A1 | 8/2009 | Arezina et al. |
| 2009/0213771 A1 | 8/2009 | Celentano et al. |
| 2009/0214036 A1 | 8/2009 | Shen et al. |
| 2009/0298513 A1 | 12/2009 | Hampel et al. |
| 2010/0022308 A1 | 1/2010 | Hartmann et al. |
| 2010/0027521 A1 | 2/2010 | Huber et al. |
| 2010/0039929 A1 | 2/2010 | Cho et al. |
| 2010/0048242 A1 | 2/2010 | Rhoads et al. |
| 2010/0063854 A1* | 3/2010 | Purvis .................... G06Q 10/02 705/5 |
| 2010/0121567 A1 | 5/2010 | Mendelson |
| 2010/0167771 A1 | 7/2010 | Raghothaman et al. |
| 2010/0179885 A1 | 7/2010 | Fiorentino |
| 2010/0280960 A1 | 11/2010 | Ziotopoulos et al. |
| 2010/0287033 A1* | 11/2010 | Mathur ............. G06F 17/30867 705/319 |
| 2010/0287052 A1* | 11/2010 | Minter ................... G06Q 30/02 705/14.64 |
| 2010/0302056 A1 | 12/2010 | Dutton et al. |
| 2010/0305855 A1 | 12/2010 | Dutton et al. |
| 2010/0331016 A1 | 12/2010 | Dutton et al. |
| 2011/0078167 A1 | 3/2011 | Sundaresan et al. |
| 2011/0103360 A1 | 5/2011 | Ku et al. |
| 2012/0115512 A1 | 5/2012 | Grainger et al. |
| 2012/0122476 A1 | 5/2012 | Lee et al. |
| 2013/0003572 A1 | 1/2013 | Kim et al. |

OTHER PUBLICATIONS

Wirelss Network. Wikipedia. http://en.wikipedia.org/wiki/Wireless_network. Nov. 17, 2008.

"Tracking Cookie." Wikipedia. http://en.wikipedia.org/wiki/Tracking_cookie. May 24, 2009.

Blom et al. "Transmission Power Measurements for Wireless Sensor Nodes and their Relationship to Battery Level." Symposium on Wireless Communication Systems. pp. 342-345, Sep. 7, 2005.

"Wi-Fi Location-Based Services—Design and Deployment Considerations." 2006 Cisco Systems. Accessed Dec. 2008. https://learningnetwork.cisco.com/docs/DOC-3418.

"Location in SIP/IP Core Architecture." Open Mobile Alliance. Sep. 4, 2008. Accessed Dec. 2008. http://www.openmobilealliance.org/technical/release_program/locsip_archive.aspx.

Want et al. "The Active Badge Location System." ACM Transactions on Office Information Systems (TOIS) vol. 10. No. 1, pp. 91-102, Jan. 1992.

Youssef et al. "Location-Clustering Techniques for WLAN Location Determination Systems." 2006. http://wrc.ejust.edu.eg/papers/ijca.pdf.

Vegni et al. "Local Positioning Services on IEEE 802.11 Networks." Radio Engineering, pp. 42-47, vol. 17, No. 2, Jun. 2008.

Ladd et al. "On the Feasibility of Using Wireless Ethernet for Indoor Localization." IEEE Transactions on Robotics and Automation, pp. 555-559, vol. 20, Issue 3, No. 3, Jun. 2004.

Kitasuka et al. "Positioning Technique of Wireless LAN Terminal Using RSSI between Terminals". Jun. 2005. Accessed Dec. 2008. http://www.techrepublic.com/whitepapers/positioning-technique-of-wireless-lan-terminals-using-rssi-between-terminals/330959.

Lafargue, Edouard. "Wireless Network Audits using Open Source Tools". SANS Institute 2003. Accessed Dec. 2008. http://www.sans.org/reading_room/whitepapers/auditing/wireless-network-audits-open-source-tools_1235.

Heidari, Mohannad. "A Testbed for Real-Time Performance Evaluation of RSS-Based Indoor Geolocation Systems in a Laboratory Environment". Apr. 21, 2005. Accessed Dec. 2008. https://www.wpi.edu/Pubs/ETD/Available/etd-050407-112549/unrestricted/massad.pdf.

Li et al. "A New Method for Yielding a Database of Location Fingerprints in WLAN" IEE Communications Proceedings, pp. 580-586, vol. 152, Issue 5, Oct. 7, 2005.

Sakata et al. "An efficient algorithm for Kriging approximation and optimization with large-scale sampling data". Computer Methods in Applied Mechanics and Engineering. Volume 193, Issues 3-5, pp. 385-404, Jan. 23, 2004.

Muthukrishnan, et al. "Sensing motion using spectral and spatial analysis of WLAN RSSI." Proceedings of the 2nd European conference on Smart sensing and context. 2007. pp. 62-76.

Capkun et al. "Mobility Helps Peer-to-Peer Security." IEEE Transactions on Mobile Computing. vol. 5, Issue 1, pp. 43-51, Jan. 2006.

(56) References Cited

OTHER PUBLICATIONS

Milojicic et al. "Peer-to-Peer Computing" Jul. 10, 2002. https://www.hpl.hp.com/techreports/2002/HPL-2002-57R1.pdf.

"The New Normal of Retailing: The Rise of the Mobile Shopper." Next Generation Retail Summit. 2010. http://www.ngrsummit.com/media/whitepapers/Microsoft_NGRUS.pdf.

Lamarca et al. "Place Lab: Positioning Using Radio Beacons in the Wild." Pervasive 2005, LNCS 3468, pp. 116-133, 2005.

Borriello et al. "Delivering Real-World Ubiquitous Location Systems." Communications of the ACM. pp. 36-41, vol. 48, Issue 3, Mar. 2005.

Schilit et al. "Challenge: Ubiquitous Location-Aware Computing and the "Place Lab" Initiative." WMASH Proceedings of the 1st ACM International Workshop on Wireless Mobile Applications and Services on WLAN Hotspots. 2003.

Hightower et al. "Practical Lessons from the Place Lab." IEEE Pervasive Computing. pp. 32-39, vol. 5, Issue 3, Jul.-Sep. 2006.

Hile et al. "Indoor Location Estimation with Placelab." http://www.cs.washington.edu/education/courses/cse590gb/04wi/projects/hile-liu/. Jan. 8, 2004. Accessed on Sep. 25, 2008.

Kang "Extracting Places from Traces of Locations." ACM SIGMOBILE Mobile Computing and Communications Review. vol. 9, Issue 3, Jul. 2005.

Lamarca et al. "Self-Mapping in 802.11 Location Systems." UbiComp 2005: Ubiquitous Computing Lecture Notes in Computer Science, 2005, vol. 3660/2005, 903, DOI: 10.1007/11551201_6.

Otsason et al. "Accurate GSM Indoor Localization." Ubiquitous Computing 2005, LNCS 3660, pp. 141-158, 2005.

Varshavsky et al. "Are GSM Phones the Solution for Localization?" 7th IEEE Workshop on Mobile Computing Systems and Applications, 2006. pp. 34-42, Aug. 1, 2005.

Chawathe et al. "A Case Study in Building Layered DHT Applications." Proceedings of the 2005 conference on Applications, technologies, architectures, and protocols for computer communications. vol. 35, Issue 4, Oct. 2005.

Lamarca et al. "Finding Yourself: Experimental location technology relies on Wi-Fi and cellphone signals instead of orbiting satellites." Dec. 2004. http://spectrum.ieee.org/computing/networks/finding-yourself.

Letchner et al. "Large-Scale Localization from Wireless Signal Strength." In Proceedings of the National Conference on Artificial Intelligence (AAAI), 2005.

Welbourne et al. "Mobile Context Inference Using Low-Cost Sensors." Location and Context-Awareness Lecture Notes in Computer Science, 2005, vol. 3479/2005, pp. 95-127.

Balakrishnan et al. "Lessons from Developing and Deploying the Cricket Indoor Location System." Nov. 7, 2003. http://www.sds.lcs.mit.edu/projects/cricket/V1Exp.pdf.

Cheng et al. "Accuracy Characterization for Metropolitan-scale Wi-Fi Localization." Proceedings of the 3rd international conference on Mobile systems, applications, and services. 2005.

"Ekahau Positioning Engine 4.2." 2008. http://www.nowire.se/images/produktblad/ekahau/datasheet_epe_42_en_11022008_Io.pdf. Sep. 29, 2008.

"Internet Industry Interacting Gambling Code: A Code for Industry Co-Regulation in the Area of Internet Gambling Content Pursuant to the Requirements of the Interactive Gambling Act 2001." Internet Industry Association. Dec. 2001.

"Internet Industry Interacting Gambling Code: A Code for Industry Co-Regulation in the Area of Internet Gambling Content Pursuant to the Requirements of the Interactive Gaming Act of 2001". Internet Industry Association. Dec. 2001.

"Wireless Network." Wikipedia. http://en.wikipedia.org/wiki/Wireless.sub.--network. Nov. 17, 2008. cited by applicant.

Chen et al. "Practical Metropolitan-Scale Positioning for GSM Phone." UbiComp 2006: Ubiquitous Computing Lecture Notes in Computer Science, 2006, vol. 4206/2006, pp. 225-242.

HTTP Cookie, redirected from tracking cookie as downloaded from wikipedia, 41 pages.

Interactive Gambling Industry Code, Dec. 2001, 7 pages.

Ladd et al. "Using Wireless Ethernet for Localization." IEEE/RJS International Conference on Intelligent Robots and Systems. 2002.

Lafargue, Edouard. "Wireless Network Audits using Open Source Tools". SANS Institute 2003. Accessed Dec. 2008. http://www.sans.org/reading.sub.--room/whitepapers/auditing/wireless-netw- ork-audits-open-source-tools.sub.--1235.

Lamarca et al. "Self-Mapping in 802.11 Location Systems." UbiComp 2005: Ubiquitous Computing Lecture Notes in Computer Science, 2005, vol. 3660/2005, 903, DOI: 10.1007/11551201.sub.--6.

Wireless Network as downloaded from wikipedia.com, pages. 5 pages.

\* cited by examiner

| Attribute_Group | |
|---|---|
| Attribute_ID | 11111111 |
| Attribute_Category | Sport |
| Attribute Value | Skiing |

Figure 4

| User_Attribute_Group | |
|---|---|
| User_ID | 12345678 |
| Attribute_ID | 11111111 |

| Group_Content_Rating ||
|---|---|
| Content_ID | 00000001 |
| Attribute_ID | 11111111 |
| Relevance_Weight | 105 |

| Location_Content_Rating ||
|---|---|
| Content_ID | 00000001 |
| Location_ID | 22222222 |
| Relevance_ Weight | 95 |

| Content_Rating_Time | |
|---|---|
| Content_ID | 00000001 |
| Time | 2011-03-28 11:01 |
| Relevance_ Weight | 95 |

CONTENT RELEVANCE WEIGHTING SYSTEM

CROSS-REFERENCE

This patent application claims the benefit of provisional patent application 61/472,054 entitled CONTENT RELEVANCE WEIGHTING SYSTEM filed on Apr. 5, 2011;

this patent application claims the benefit of provisional patent application 61/427,753 entitled INTERACTIVE DISPLAY SYSTEM filed on Dec. 28, 2010;

this patent application claims the benefit of provisional patent application 61/427,755 entitled INTERACTIVE DISPLAY SYSTEM filed on Dec. 28, 2010;

this patent application claims the benefit of provisional patent application 61/454,664 entitled USER INTERFACE FOR GEOFENCE-ASSOCIATED CONTENT filed on Mar. 21, 2011;

this patent application claims the benefit of provisional patent application 61/482,834 entitled CONTENT RELEVANCE WEIGHTING SYSTEM filed on May 5, 2011;

this patent application is a continuation-in-part of patent application Ser. No. 13/218,256 (now U.S. Pat. No. 10,430,492) entitled SYSTEM AND METHOD FOR HANDSET POSITIONING WITH DYNAMICALLY UPDATED WI-FI FINGERPRINTING filed on Aug. 25, 2011 that claims the benefit of provisional patent application 61/376,936 filed on Aug. 25, 2010, provisional patent application 61/351,770 filed on Jun. 4, 2010, and provisional patent application 61/352,242 filed on Jun. 7, 2010;

this patent application is a continuation-in-part of patent application Ser. No. 13/153,214 (now U.S. Pat. No. 9,507,494) entitled MERCHANT CONTROLLED PLATFORM SYSTEM AND METHOD filed on Jun. 3, 2011 that claims the benefit of provisional patent application 61/351,677 filed on Jun. 4, 2010, provisional patent application 61/351,770 filed on Jun. 4, 2010, and provisional patent application 61/352,242 filed on Jun. 7, 2010;

this patent application is a continuation-in-part of patent application Ser. No. 13/153,238 (now U.S. Pat. No. 9,408,032) entitled MERCHANT CONTROL PLATFORM SYSTEM AND METHOD WITH LOCATION-BASED CONTENT DELIVERY filed on Jun. 3, 2011 that claims the benefit of provisional patent application 61/351,677 filed on Jun. 4, 2010, provisional patent application 61/351,770 filed on Jun. 4, 2010, and provisional patent application 61/352,242 filed on Jun. 7, 2010;

this patent application is a continuation-in-part of patent application of patent application Ser. No. 13/153,248 (now U.S. Pat. No. 9,615,347) entitled LOCATION POSITIONING ENGINE SYSTEM AND METHOD filed on Jun. 3, 2011 that claims the benefit of the benefit of provisional patent application 61/351,677 filed on Jun. 4, 2010, provisional patent application 61/351,770 filed on Jun. 4, 2010, and provisional patent application 61/352,242 filed on Jun. 7, 2010;

the above patent applications hereby incorporated by reference in this patent application.

FIELD

The present invention relates to a system and method for delivering relevant content to a wireless handset. More particularly, the present invention relates to a system and method for adjusting a relevance weight value for a content item based on user reaction to the content.

BACKGROUND

Services that provide ranked lists of results are well known, for example, in the areas of internet search and advertising. Such services may gauge user response to the provided content to improve the relevance of ranked results provided to the users of the service. Passive user responses, such as selection of content, manipulation of content, or time spent viewing particular content are monitored and the relevance weighting applied to the content is adjusted accordingly. Active user feedback, such as a rating provided by the user for a particular content item, is also used to impact relevance weighting for content.

User profile information such as user interest, user location, etc. has been used in existing content delivery systems to impact the relevance weighting of content. However, existing systems lack means for adjusting relevance weighting of content for a group of users having a shared profile attribute based on both active and passive user responses to received content.

Moreover, there remains a need for a content delivery system that ranks content based on the location of the user accessing the content.

SUMMARY

A system for adjusting a relevance weight value for a content item is described. The system comprises a plurality of user profiles, each user profile comprising a user identification. The system further comprises a plurality of content items. An initial relevance weight value is associated with each content item. The system further comprises a network. A content delivery module is communicatively coupled to the network. The content delivery module is configured to deliver a plurality of content items to a wireless device via the network. The wireless device is configured to display the content items. A user interface disposed on the wireless device is configured to receive a feedback input associated with at least one content item and transmit the feedback input to the content delivery module. A positive review input disposed on the wireless device corresponds to a positive feedback input. A negative review input disposed on the wireless device corresponds to a negative feedback input. A relevance weight adjustment module operatively coupled to the content delivery module is configured to perform one of a subtraction operation or an addition operation. The subtraction operation comprises subtracting a first point value from the relevance weight value associated with a first set of users when a negative review is received for the content item. The addition operation comprises adding a first point value to the relevance weight value associated with a first set of users when a positive review is received for the content item.

In another embodiment, a system for adjusting a relevance weight value for a content item comprises a means for displaying content items.

A method for adjusting a relevance value for a content item is also described. The method comprises associating at least one attribute group with a user identification. The method further comprises associating an initial relevance weight value with a content item. A plurality of content items are delivered to a wireless device via a network. The content items are displayed on the wireless device. A user interface disposed on the wireless device receives a feedback input associated with at least one content item. The feedback input is transmitted to the content delivery module. The transmitting comprises transmitting a positive review feedback input when feedback input is received from a positive feedback input disposed on the wireless device. The transmitting further comprises transmitting a negative review feedback input when feedback input is received from a negative feedback input disposed on the wireless device. One of a subtraction operation or an addition operation are performed with a relevance weight adjustment module operatively coupled to the content delivery module. The subtraction operation comprises subtracting a first point value from the relevance weight value associated with a first set of users when a negative review is received for the content item. The addition operation comprises adding a first point value to the relevance weight value associated with a first set of users when a positive review is received for the content item.

FIGURES

The present invention will be more fully understood by reference to the following drawings which are for illustrative, not limiting, purposes.

FIG. 4 shows an illustrative database table entry for associating a user identification with an attribute group.

FIG. 5 shows an illustrative database table entry for associating a user identification with an attribute group.

FIG. 6 shows an illustrative database table entry for associating a content item with an attribute group.

FIG. 7 shows an illustrative database table entry for associating a content item with a location identifier.

DETAILED DESCRIPTION

Persons of ordinary skill in the art will realize that the following description is illustrative and not in any way limiting. Other embodiments of the claimed subject matter will readily suggest themselves to such skilled persons having the benefit of this disclosure.

A relevance weighting system for content is described. Content items are accessible to a plurality of users having user profiles. The content items are delivered via a network to a computing device, such as a wireless handset. The user of the wireless handset may provide feedback for a content item. Based on the feedback received, a relevance weight value associated with the content item is adjusted. One or more passive measures of user response to the content item may also be used to adjust the relevance weight value associated with the content item.

According to one embodiment, when positive feedback is received, for each attribute group associated with the user, a predetermined point value is added to the relevance weight value associated with the content item. An attribute group may be any category to which a user belongs as determined from information provided by or information collected about the user, for example, a location of the user (such as a city or zip code), a user interest, an age of the user or age group to which the user belongs, and so on. Similarly, if negative feedback is received, a predetermined point value is subtracted from the content item relevance weight value for each attribute group associated with the user.

In another embodiment, when positive feedback is received, a predetermined point value is added to a content item relevance weight value for all users. Similarly, if negative feedback is received, a predetermined point value is subtracted from a content item relevance weight value for all users.

In an alternative embodiment, if a content item transmitted to one or more wireless handsets more than a predetermined number of times without being selected, a predetermined point value is subtracted from a content item relevance weight value for all users.

In another embodiment, if a content item is selected, a predetermined point value is added to a content item relevance weight value for all users.

In a further embodiment, if a content item is selected on a wireless handset, a predetermined point value is added to a content item relevance weight value associated with the location occupied by the user of the wireless handset.

It will be recognized that the relevance weight value may be adjusted according to a combination of the embodiments described above.

Figure 1:
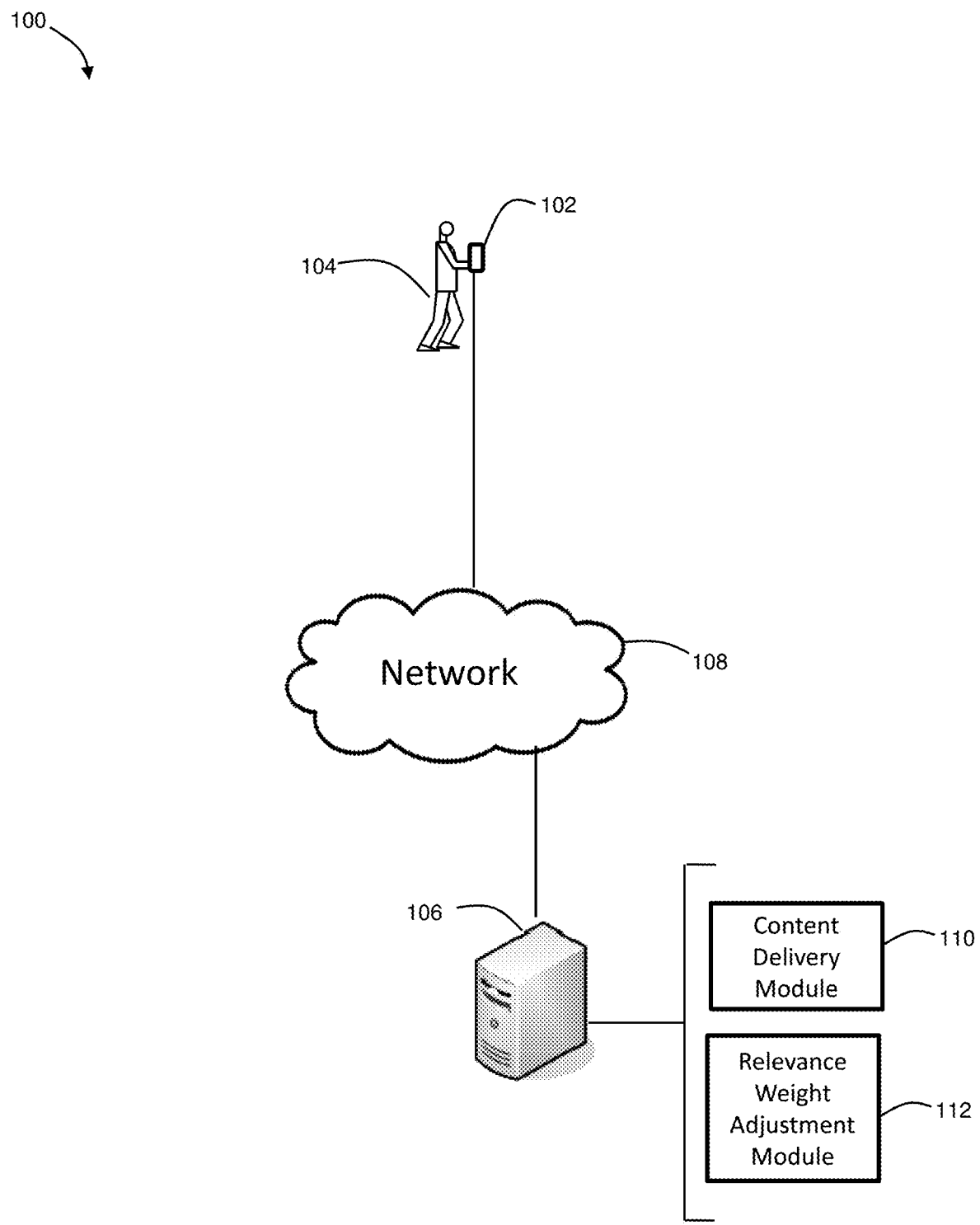
FIG. 1 shows a system diagram of an illustrative content item relevance weighting system.

Referring to FIG. 1, a system diagram of an illustrative content item relevance weighting system is shown. Wireless handset 102 is operated by user 104. The wireless handset may be a mobile handset, mobile phone, wireless phone, portable cell phone, cellular phone, portable phone, a personal digital assistant (PDA), a tablet, a portable media device, or any type of mobile terminal which is regularly carried by a user and has all the elements necessary for operation in a wireless communication system.

Wireless handset 102 periodically receives content items via network 108. The wireless communications include, by way of example and not of limitation, CDMA, WCDMA, GSM or UMTS or any other wireless communication system such as wireless local area network (WLAN), Wi-Fi or WiMAX. Network 108 may be a local area network ("LAN"), wide area network ("WAN"), or any other network to facilitate communication among computers and wireless communication devices.

Typically the content delivered to wireless handset 102 originates from a server such as remote server 106. Content delivery module 110 and relevance weight adjustment module 112 run on a processor, for example, a processor of the remote server. In some embodiments, the content delivery module and relevance weight adjustment module run on separate processors. Content delivery module 110 selects and transmits one or more content items to wireless handset 102. The content items are displayed on a display of the wireless handset. Content deliver module may transmit a content item to the wireless handset at fixed intervals, for example, once per thirty seconds or once per five minutes, e.g., once per minute.

Relevance weight adjustment module 112 adjusts a relevance weight value associated with a content item. Typically, content items and relevance weight values are stored on a database, which may be located on remote server 106.

Figure 2:
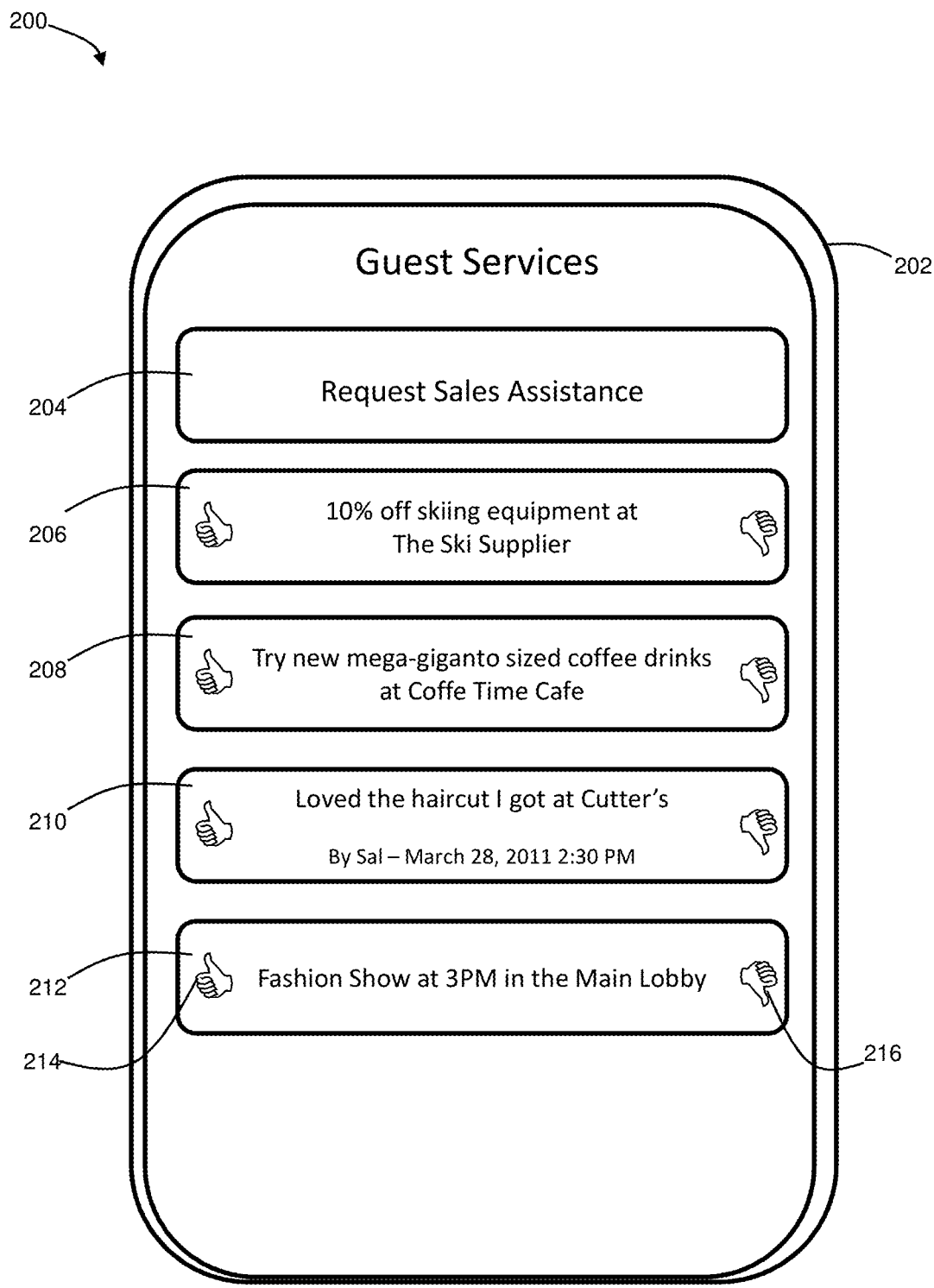
FIG. 2 shows an illustrative user interface for displaying content items on a wireless handset.

Referring now to FIG. 2, an illustrative user interface 200 for displaying content items on wireless handset 102 is shown. The user interface presents a plurality of content items to the user of wireless handset 102. A content item may be any information or product promotion shared with or created by a user. For example, a content item may include text, audio, video, image or a link such as a link to an external website, link to an interactive map or link to one or more content items. In some embodiments, a content item may be an application, such as a purchasing or gaming interface. A content item may be information provided by a facility to a user, such as content items 206, 208 and 212. Alternatively, a content item may be user-created content, such as content item 210. In some embodiments, a content item may activate command function or request function, such as content item 204.

Illustrative user interface 200 is shown displaying a wireless handset having a touchscreen-type interface; however, it will be appreciated that the user interface may be displayed on any handheld wireless device having a display and a user input means (such as keypad, touchscreen interface, or stylus). Illustrative content items 204-212 are selectable items such as virtual buttons that are activated when the user touches the button on a touchscreen or selects the button with a pointing device.

A feedback input may be displayed proximate to or in conjunction with a content item. The feedback input allows a user to react to the content items displayed. In some embodiments, a positive feedback input, a negative feedback input, or both are displayed. The feedback inputs may be displayed, for example, as "thumbs up" and "thumbs down" symbols displayed on a user-created content item button, as shown at 214 and 216, respectively. The thumbs up and thumbs down input prompts are operable separately from the content item button. When a user selects a feedback input prompt, the wireless handset transmits a feedback message via the network to the remote server 106 indicating the feedback response, e.g., whether the feedback was positive ("thumbs up") or negative ("thumbs down"). The feedback message may also comprise information about the user, such as a unique user identification (e.g., the User_ID indicated in FIG. 3 below). Alternative feedback input means, such as a system that allows a user to rate a content item on a scale, such as a scale of one to ten or a scale of one to five, may be used.

A "positive feedback input" may also be referred to as a positive review. A "negative feedback input" as used herein may refer to a negative review.

Typically, the feedback input is used to modify a relevance weight value stored in association with the content item. The feedback input may be used to rank content to be displayed in the user interface. The content items transmitted from the remote server to the wireless handset may be filtered by relevance weight value such that a predetermined number of highest ranked content items are returned or such that only those content items exceeding a predetermined threshold are returned.

Figure 3:
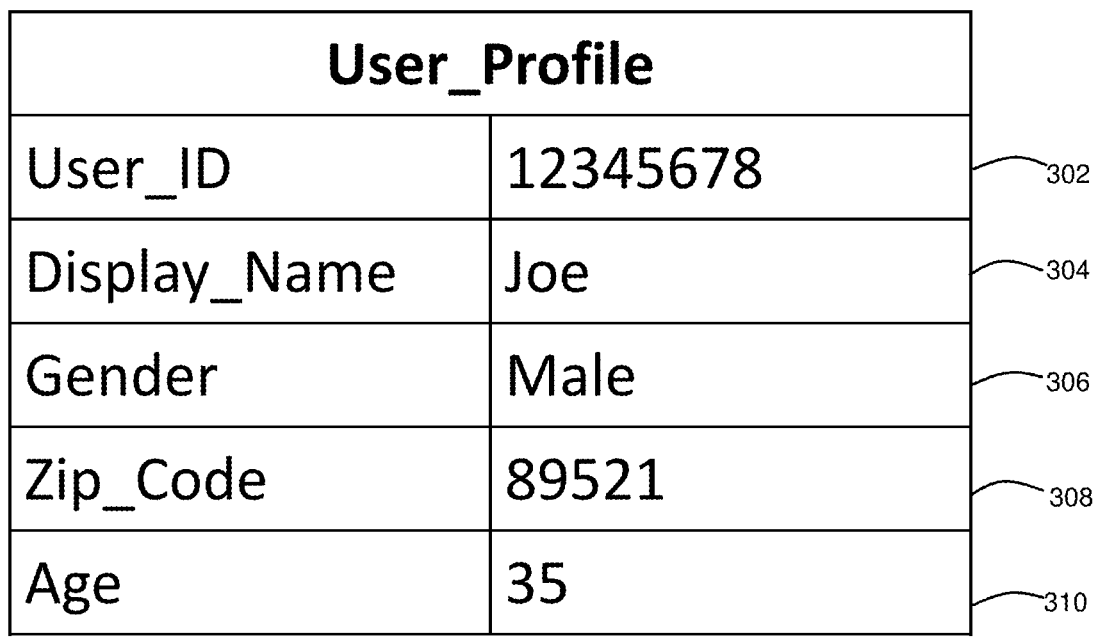
FIG. 3 shows an illustrative database table entry for a user profile.

Referring now to FIG. 3, an illustrative database table entry 300 for a user profile is shown. The table may be populated by the user with information provided via a user profile interface on the wireless handset 102. In some embodiments, the user enters user profile information using an interface on a home computer or other device having access to network 108. User profile information is transmitted via network 108 to a database, such as a relevance engine database residing on remote server 106. The user profile information may be stored in the database in a database table, such as a User_Profile database table. The User_Profile table comprises the field user_ID 302. The illustrative entry 300 in the User_Profile table additionally comprises fields Display_Name 304, Gender 306, Zip_Code 308 and Age 310. In some embodiments, the User_Profile table stores additional information such as a user address, user phone number, user name, etc. In some embodiments, a birthday or an age range is stored for the user rather than an age of the user.

Referring to FIG. 4, an illustrative database table entry 400 for an attribute group is shown. The Attribute_Group table stores a unique identifier for each attribute group available to be associated with a user. Attribute groups for a user may include information provided by the user, such as a location of the user, a user interest, an age of the user or an age group to which the user belongs. In some embodiments, the attribute groups include information collected about a user, for example, information from the user's transaction history with a merchant.

The Attribute_Group table is stored in a database, such as a relevance engine database. The Attribute_Group table comprises fields Attribute_ID 402 and Attribute_Value 406. The illustrative entry 400 in the Attribute_Group table additionally comprises the field Attribute_Category 404. According to the illustrative entry in the Attribute_Group table, the attribute with the Attribute_ID number 11111111 is an attribute with attribute category "sport" and attribute value "skiing." If the user indicates skiing as an interest, the attribute ID for skiing may be associated with the user ID in a User_Attribute_Group database table as indicated in FIG. 5.

Referring to FIG. 5, an illustrative database table entry 500 for associating a user identification with an attribute group is shown. The User_Attribute_Group table comprises fields Attribute_ID 502 and Attribute_ID 504. The illustrative entry in the User_Attribute_Group table associates user ID "12345678" with attribute id "11111111," indicating that user "Joe" having user ID 12345678 (as indicated in FIG. 2) is associated with the attribute skiing, identified by attribute ID 11111111. The table entry may have been created with Joe indicated an interest in skiing using a user profile interface or other user interface. Alternatively, a merchant or other content administrator may have determined that Joe is interested in skiing based on, for example, Joe's purchases of skiing equipment from the merchant, and created the User_Attribute_Group table entry shown accordingly.

Referring to FIG. 6, an illustrative database table entry 600 for associating a content item with an attribute group and storing a relevance weight value for the association is shown. The Group_Content_Rating table comprises fields Content_ID 602, Attribute_ID 604 and Relevance_Weight 606. Content_ID has value "00000001," indicating a unique identification for a content item. Illustrative content items are shown in FIG. 2. For example, content item 00000001 may be text advertising a sale on skiis. In the illustrative entry, content 00000001 in association with attribute 11111111 (skiing) has a relevance weight value of 105.

By way of illustration, user Joe (having user ID 12345678) has indicated an interest in skiing, resulting in the User_Attribute_Group entry shown in FIG. 4. Content item 00000001 may be an advertisement for a sale on skiing equipment, such as content item 206 shown in FIG. 2. When Joe provides positive feedback for content item 00000001, all attribute groups associated with Joe and the content item receive an increase to the relevance weight value. If, for example, an initial relevance weight value of 100 is used for the association between Content_ID 00000001 (e.g., the skiing advertisement) and Attribute_ID 11111111 (e.g., skiing), the positive feedback results in a point increase, for example, a five point increase, resulting in an adjusted relevance weight value of 105. Methods for adjusting Relevance_Weight 606 are described in more detail with reference to FIGS. 9 and 10.

Referring to FIG. 7, an illustrative database table entry 700 for associating a content item with a location identifier and storing a relevance weight value for the association is shown. The Location_Content_Rating table comprises fields Content_ID 702, Location_ID 704 and Relevance_Weight 706. Location_ID has value "22222222," indicating a unique identification for a location.

In some embodiments, the Location_ID is a unique identification associated with a geofence as described in U.S. provisional patent application Ser. No. 61/454,664, entitled "USER INTERFACE FOR GEOFENCE ASSOCIATED CONTENT." A geofence is a virtual geographic boundary line delineating a geographic area. For example, a database table entry may associate a set of coordinates corresponding to the area bounded by a geofence with a unique Location_ID. The wireless handset 102 is configured to determine whether it is located within a geofence. In some embodiments, the wireless handset may receive content items associated with the geofence in which the wireless handset is located.

In alternative embodiments, Location_ID may be associated with a zip code, city, GPS coordinates, or a distance range surrounding any of the preceding (e.g., a 300 foot radius surrounding a set of GPS coordinates). Location_ID may alternatively indicate a location determined by scanning a code, such as a QR code, with the wireless handset or a location determined by taking a photograph of the environment with the wireless handset.

By way of illustration, content item 00000001 may be an advertisement for a sale on skiing equipment, such as content item 206. In one example, the wireless handset displaying content item 206 is located in a geofence encompassing the ski store to which the advertisement applies. If the user of the handset provides negative feedback, the relevance weight value associated with location (e.g., the ski store geofence) and the content item (e.g. the ski equipment advertisement) is decreased by a predetermined point value. If, for example, an initial relevance weight value of 100 is used for the association between Content_ID 00000001 and Location_ID 22222222, the negative feedback results in a point decrease, for example, a five point decrease, resulting in an adjusted relevance weight value of 95. A method for adjusting Relevance_Weight 706 is described in more detail with reference to FIGS. 11-12.

Figures 8A, 8B:
FIG. 8A shows an illustrative database table entry for associating a content item with a time a relevance weight value.
FIG. 8B shows an illustrative graph showing a change in relevance weight value for a content item over time.

Referring now to FIG. 8A, an illustrative database table entry 800 for associating a content item with a time and a relevance weight value. The Content_Rating_Time table comprises fields Content_ID 802, Time 804 and Relevance_Weight 806. Each time the relevance weight for a content item changes, the relevance weight value and time are logged such that a record of the change in relevance weight for the content item over time as shown in FIG. 8B may be created. The Content_Rating_Time table may further comprise field Attribute_ID or Location_ID to allow the change in relevance weight value over time to be analyzed for a particular attribute group or location.

Referring to FIG. 8B, a graph showing a change in relevance weight value for a content item over time is shown. The graph shown in FIG. 8B may be created from the entries in the Content_Rating_Time table. The change in relevance weight value over time may be useful to content administrators in assessing the success of content items.

Figure 9:
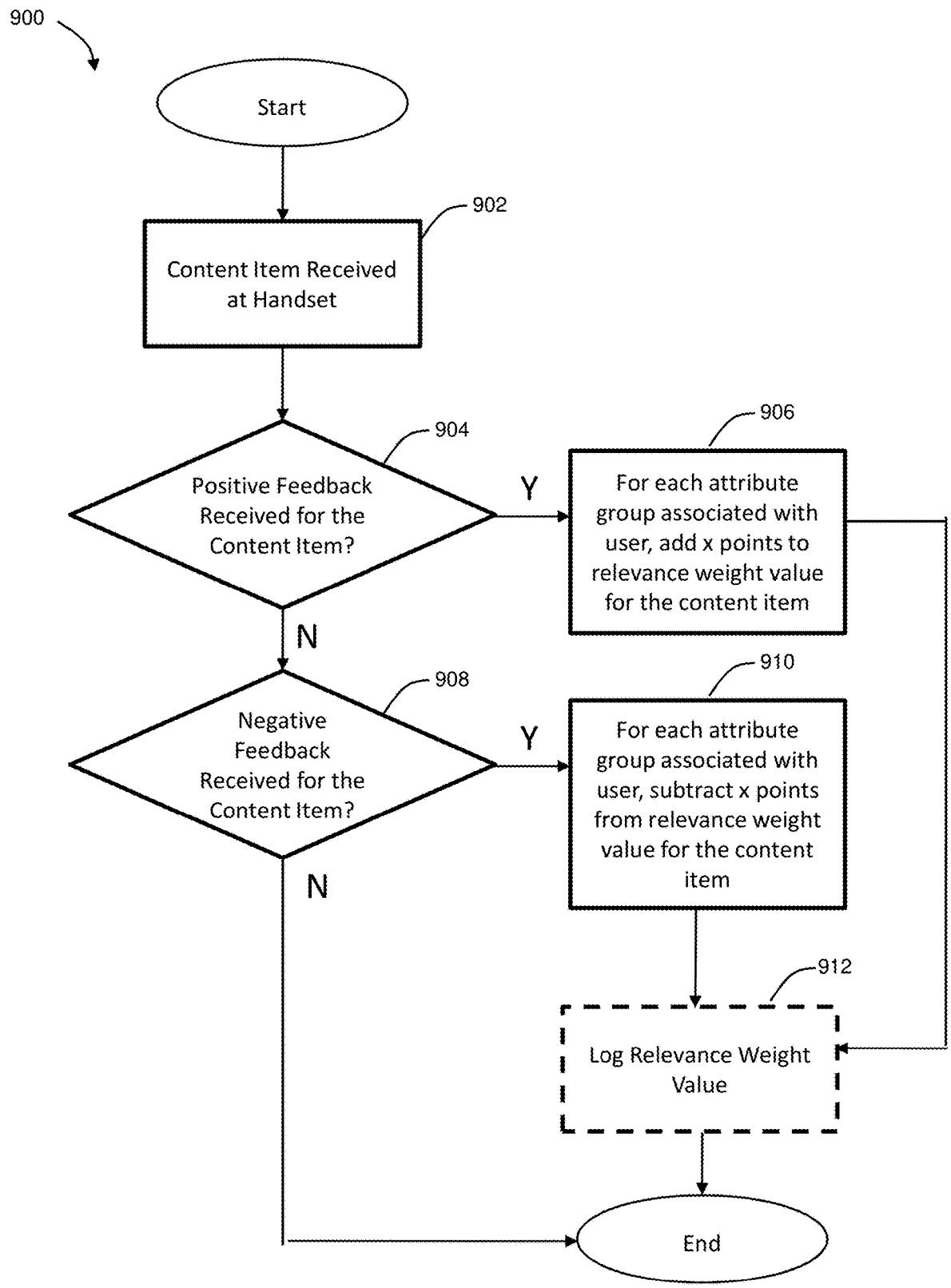
FIG. 9 shows an illustrative flow chart indicating a method for adjusting relevance weighting according to a first embodiment.

Referring now to FIG. 9, an illustrative flow chart indicating a method for adjusting relevance weighting according to a first embodiment is shown. The method begins at block 902, at which a content item is received at the wireless handset 102. The content item may be one of a plurality of content items displayed on the handset. At decision diamond 904, relevance weight adjustment module 112 determines whether positive feedback has been received from the wireless handset. If positive feedback has been received for a content item, the method proceeds to block 906. At block 906, for each attribute group associated with the user who provided the positive feedback, a point value x is added to the value of the Relevance_Weight field of the Group_Content_Rating entry having a Content_ID value matching the content item identifier and an Attribute_ID value matching the attribute identifier. Point value x may be any point value, for example, 5 points.

For example, if user 12345678 (display name "Jim") provides positive feedback for the content item having content identifier 00000001, all attribute groups associated with user 12345678 are located. Accordingly, the User_Attribute_Group table is queried to return all entries for user 12345678. Since the attribute having attribute identifier 11111111 is associated with user 12345678 in the User_Attribute_Group table, the relevance weight associated with Attribute_ID 11111111 will be modified for the selected content item. In the Group_Content_Rating table, the value of Relevance_Weight is adjusted for the entry having Content_ID 00000001 and Attribute_ID 11111111. Because positive feedback was provided, a point value is added to the current value of Relevance_Weight. For example, when positive feedback is provided, 5 points may be added to the current value of Relevance Weight.

If no entry exists in Group_Content_Rating table having an Attribute_ID matching an attribute of the user providing feedback and a Content_ID of the content item for which feedback was received, a new entry is created in Group_Content Rating when the feedback is received. The new entry has a Content_ID matching the identifier of the content item for which feedback was received and an Attribute_ID matching the identifier of an attribute of the user providing feedback. When a new entry is created, the new entry may have a Relevance_Weight value that is a default value. Alternatively, the new entry may have a Relevance_Weight value that is the sum of a default value and the point value modification resulting from the user feedback.

If additional attribute entries were located for user 12345678 in the User_Attribute_Group table, the Relevance_Weight value is adjusted for the additional attributes. The process of creating new records (where necessary) and modifying the Relevance_Weight value is continued until the relevance weight has been adjusted for each attribute group associated with the user.

In some embodiments, the method proceeds to optional block 912, at which the adjusted relevance weight value is logged. For example, an entry in a database table such as Content_Rating_Time may be made.

If no positive feedback is received for a content item, the method proceeds to decision diamond 908, at which it is determined whether negative feedback has been received for the content item. If negative feedback has been received, the method proceeds to block 910. At block 910, for each attribute group associated with the user who provided the negative feedback, a point value is subtracted from the value of the Relevance_Weight field of the Group_Content_Rating entry having a Content_ID value matching the content item identifier and an Attribute_ID value matching the attribute identifier. If no entry in the Group_Content_Rating table exists for the Content_ID and Attribute_ID, a new entry is created as described above. The method then proceeds to optional step 912 at which the relevance weight value is logged.

Figure 10:
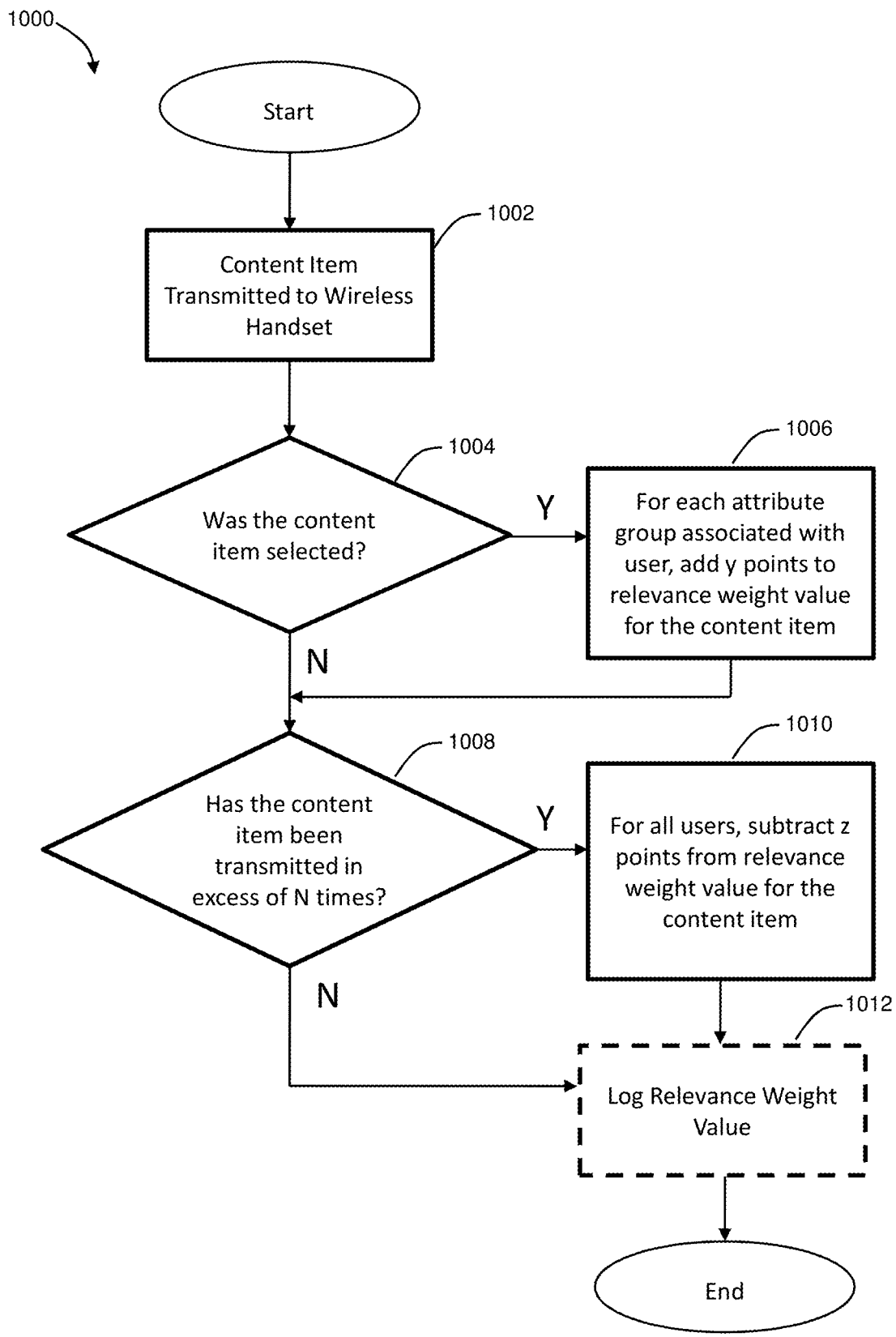
FIG. 10 shows an illustrative flow chart indicating a method for adjusting relevance weighting according to a second embodiment.

Referring now to FIG. 10, an illustrative flow chart indicating a method for adjusting relevance weighting according to a second embodiment is shown. The method begins at block 1002, at which a content item is transmitted to the wireless handset 102. The content item may be one of a plurality of content items displayed on the handset. At decision diamond 1004, relevance weight adjustment module 112 determines whether the content item was selected. A user may select a content item by, for example, clicking a content item button such as content item button 206. If the content item is selected, the method proceeds to block 1006. At block 1006, for each attribute group associated with the user who provided the positive feedback, a point value y is added to the value of the Relevance_Weight field of the Group_Content_Rating entry having a Content_ID value matching the content item identifier and an Attribute_ID value matching the attribute identifier. Point value y may be any point value, for example, 2 points. If no entry in the Group_Content_Rating table exists for the Content_ID and Attribute_ID, a new entry is created as described above The method proceeds to block 1008, at which the relevance weight adjustment module determines whether a content item has been transmitted by content delivery module 110 in excess of N times. N may be a number of times a content item is delivered from remote server 106 to wireless handset 102 or the number of times a content item is delivered to all wireless handsets capable of receiving the content item. For example, N may be 10 serves. If the content item has been transmitted in excess of N times, z points are subtracted from the value of the Relevance_Weight field of the Group_Content_Rating entry having a Content_ID value matching the content item for all users. Point value z may be any point value, for example, 5 points.

To adjust the Relevance_Weight field for all users, an attribute group having a predetermined Attribute_ID, for example, Attribute_ID 00000000, may be associated with every contact ID. For example, each time a new User_ID is created, User_Attribute_Group may receive an entry associating the new User_ID with Attribute_ID 00000000. The Relevance_Weight value may be adjusted for the Group_Content_Rating entry having a Content_ID value matching the delivered content item and Attribute_ID 00000000. In this manner, the relevance weight is adjusted for all users when a content item has been transmitted in excess of N times.

In some embodiments, the method then proceeds to optional step 1012 at which the relevance weight value is logged.

Figure 11:
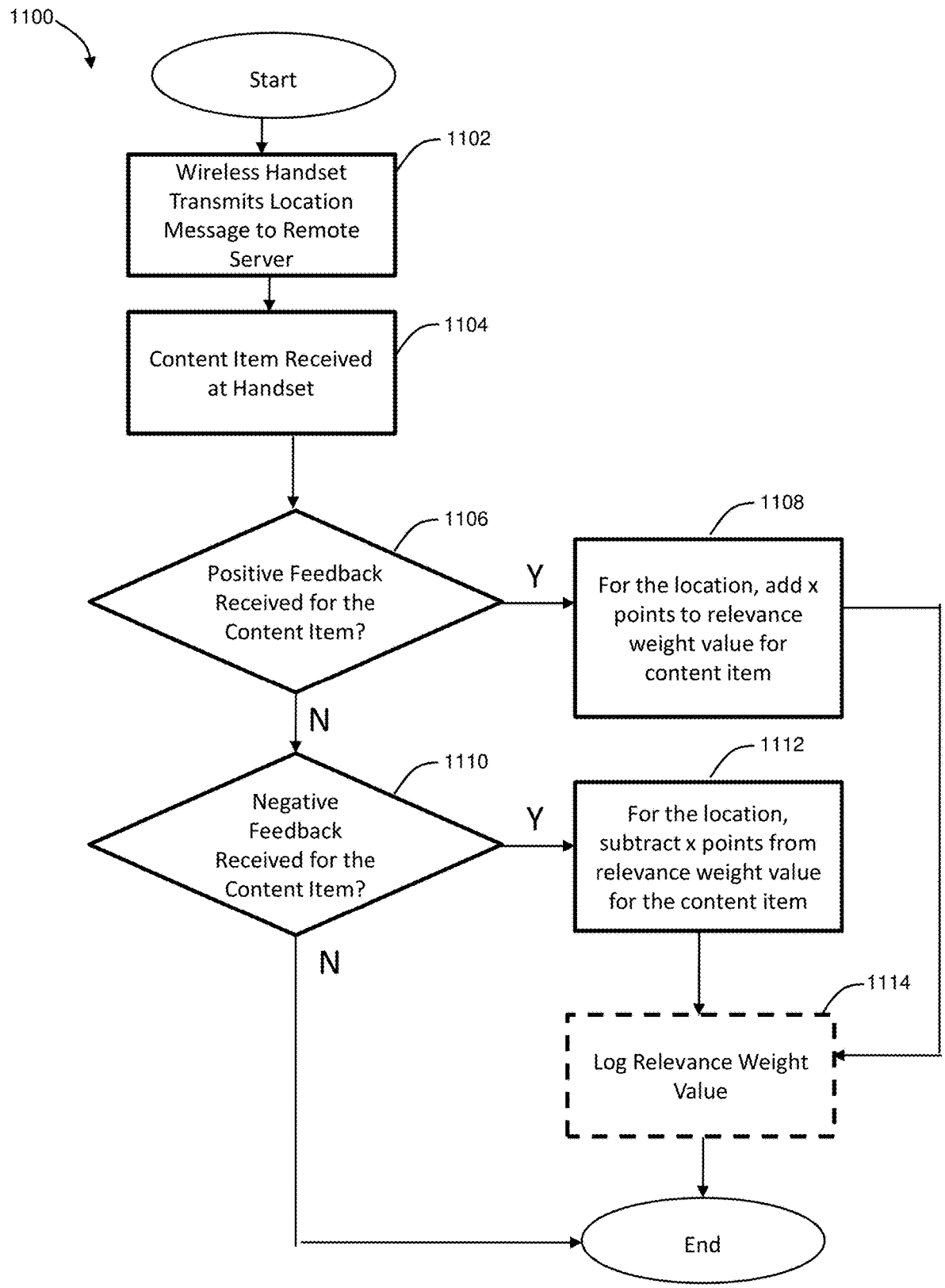
FIG. 11 shows an illustrative flow chart indicating a method for adjusting relevance weighting according to a third embodiment.

Referring now to FIG. 11, an illustrative flow chart indicating a method for adjusting relevance weighting according to a third embodiment is shown. The method begins at block 1102, at which a wireless handset transmits a location message to remote server 106. The location message comprises information about the location of the wireless handset. The location is identified by unique identifier Location_ID. At block 1104, a content item is received at the wireless handset 102. In some embodiments, the content item received is related to the location information transmitted in the location message. For example, the content item Content_ID is associated with a Location_ID in an entry in a database table such as the Location_Content_Rating table indicated at FIG. 7. The content item may be one of a plurality of content items displayed on the handset.

At decision diamond 1106, relevance weight adjustment module 112 determines whether positive feedback has been received from the wireless handset. If positive feedback has been received for a content item, the method proceeds to block 1108. At block 1108, a point value x is added to the value of the Relevance_Weight field of the Location_Content_Rating entry having a Content_ID value matching the content item identifier and an Location_ID value matching the location identifier. Point value x may be any point value, for example, 5 points.

If no entry exists in Location_Content_Rating table having an Attribute_ID matching an attribute of the user providing feedback and a Content_ID of the content item for which feedback was received, a new entry is created in Location_Content_Rating when the feedback is received. The new entry has a Content_ID matching the identifier of the content item for which feedback was received and a Location_ID matching the identifier of an attribute of the user providing feedback. When a new entry is created, the new entry may have a Relevance_Weight value that is a default value. Alternatively, the new entry may have a Relevance_Weight value that is the sum of a default value and the point value modification resulting from the user feedback.

In some embodiments, the method proceeds to optional block 1114, at which the adjusted relevance weight value is logged. For example, an entry in a database table such as Content_Rating_Time may be made.

If no positive feedback is received for a content item, the method proceeds to decision diamond 1110, at which it is determined whether negative feedback has been received for the content item. If negative feedback has been received, the method proceeds to block 1112. At block 1112, for the Location_ID matching the location identifier, a point value is subtracted from the value of the Relevance_Weight field of the Location_Content_Rating entry having a Content_ID value matching the content item identifier and Location_ID value matching the location identifier. If no entry in the Location_Content_Rating table exists for the Content_ID and Attribute_ID, a new entry is created as described above. The method then proceeds to optional step 1114 at which the relevance weight value is logged.

Figure 12:
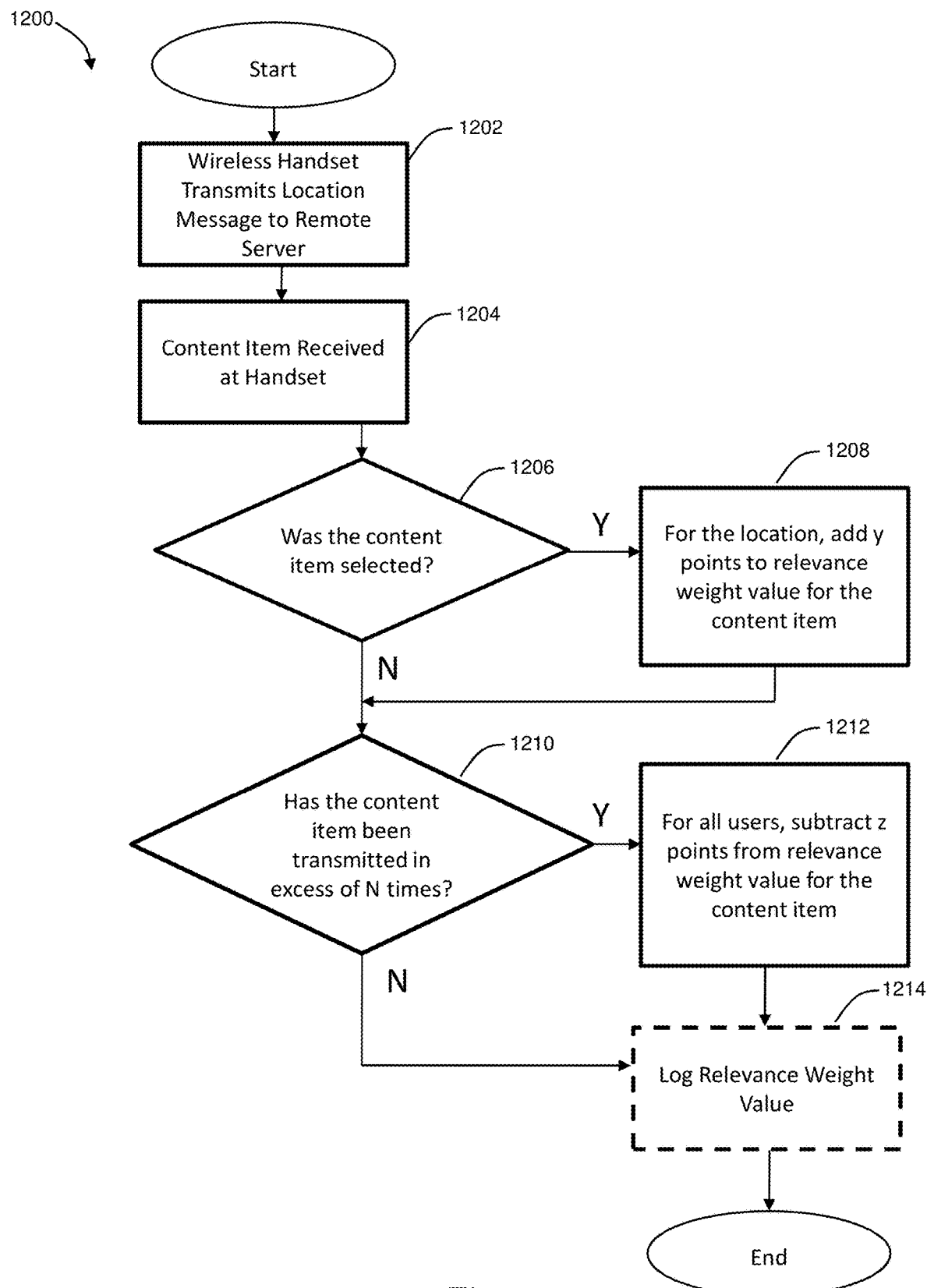
FIG. 12 shows an illustrative flow chart indicating a method for adjusting relevance weighting according to a fourth embodiment.

Referring now to FIG. 12, an illustrative flow chart indicating a method for adjusting relevance weighting according to a fourth embodiment is shown. The method begins at block 1202, at which a wireless handset transmits a location message to remote server 106. The location message comprises information about the location of the wireless handset. The location is identified by unique identifier Location_ID. At block 1204, a content item is received at the wireless handset 102. In some embodiments, the content item received is related to the location information transmitted in the location message. For example, the content item Content_ID is associated with a Location_ID in an entry in a database table such as the Location_Content_Rating table indicated at FIG. 7. The content item may be one of a plurality of content items displayed on the handset.

At decision diamond 1206, relevance weight adjustment module 112 determines whether the content item was selected. A user may select a content item by, for example, clicking a content item button such as content item button 206. If the content item is selected, the method proceeds to block 1208. At block 1208, for the Location_ID of the location reported by the wireless handset, a point value y is added to the value of the Relevance_Weight field of the Location_Content_Rating entry having a Content_ID value matching the content item identifier and an Attribute_ID value matching the attribute identifier. Point value y may be any point value, for example, 2 points. If no entry in the Location_Content_Rating table exists for the Content_ID and Attribute_ID, a new entry is created as described above The method proceeds to block 1210, at which the relevance weight adjustment module determines whether a content item has been transmitted by content delivery module 110 in excess of N times. N may be a number of times a content item is delivered from remote server 106 to wireless handset 102 or the number of times a content item is delivered to all wireless handsets capable of receiving the content item. For example, N may be 10 serves during which the content item is delivered. If the content item has been transmitted in excess of N times, z points are subtracted from the value of the Relevance_Weight field of the Location_Content_Rating entry having a Content_ID value matching the content item for all users. Point value z may be any point value, for example, 5 points.

To adjust the Relevance_Weight field for all users, a location having a predetermined Location_ID, for example, Location_ID 00000000, may be associated with every contact ID. For example, each time a new User_ID is created, User_Attribute_Group may receive an entry associating the new User_ID with Location_ID 00000000. The Relevance_Weight value may be adjusted for the Location_Content_Rating entry having a Content_ID value matching the delivered content item and Location_ID 00000000. In this manner, the relevance weight is adjusted for all users when a content item has been transmitted in excess of N times.

In some embodiments, the method then proceeds to optional step 1214 at which the relevance weight value is logged.

It is to be understood that the detailed description of illustrative embodiments are provided for illustrative purposes. The scope of the claims is not limited to these specific embodiments or examples. Therefore, various process limitations, elements, details, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A system for adjusting a relevance weight value for a content item, comprising:
   a network communicatively coupled to at least one access point;
   a wireless device corresponding to a first user identification;
   a remote server including a processor, the processor having at least a relevance engine database stored thereon, the relevance engine database including a plurality of user profiles, each user profile comprising a user identification, wherein the remote server is communicatively coupled to the network;
   each user identification associated with at least one attribute group, wherein the first user identification and a second user identification are associated with a first attribute group;
   a plurality of content items;
   an initial relevance weight value corresponding to an association between the first attribute group and each content item, wherein each content item includes a rank relative to the plurality of content items corresponding to the initial relevance weight value;
   a plurality of beacons communicatively coupled to the network, wherein each beacon of the plurality of beacons is configured to forward data to at least one beacon of the plurality of beacons, wherein each beacon broadcasts a beacon signal including a radio frequency and a beacon identifier;
   a beacon signal strength associated with each beacon signal, wherein the beacon signal strength is determined by the wireless device;
   a positioning module communicatively coupled to the remote server, the positioning module configured to receive a location message from the wireless device through the access point via the network, the location message including at least one beacon identifier and associated beacon signal strength, the positioning module further configured to determine a location of the wireless device, the location associated with the at least one beacon identifier and associated beacon signal strength;
   a content delivery module communicatively coupled to the remote server, the content delivery module configured to deliver a plurality of content items associated with the location of the wireless device via the network, wherein the plurality of content items are further associated with at least one attribute group associated with the first user identification, and wherein the at least one attribute group includes the first attribute group;
   the wireless device configured to display at least one of the plurality of content items;
   a user interface disposed on the wireless device, the user interface configured to:
      receive a feedback input associated with the at least one content item; and
      transmit the feedback input to the content delivery module through the access point via the network;
   a review input disposed on the wireless device that corresponds to the feedback input; and
   a relevance weight adjustment module operatively coupled to the content delivery module, the relevance weight adjustment module configured to adjust the initial relevance weight value corresponding to the association between the at least one content item and the first attribute group based on the feedback input, wherein the relevance weight adjustment module further adjusts the rank of the at least one content item relative to the plurality of content items.

2. The system of claim 1, wherein the content delivery module is further configured to receive a positive review input from the wireless device that corresponds to a positive feedback input and a negative review input that corresponds to a negative feedback input; and
   wherein the relevance weight adjustment module is configured to perform one of a subtraction operation and an addition operation.

3. The system of claim 2, wherein the subtraction operation comprises subtracting a first point value from the relevance weight value associated with the at least one content item when a negative review is received for the at least one content item and the addition operation comprises adding a first point value to the relevance weight value associated with the at least one content item when a positive review is received for the at least one content item.

4. The system of claim 3, wherein the relevance weight adjustment module is further configured to perform:
   a second subtraction operation comprising subtracting a second point value from the relevance weight value associated with the at least one content item when a negative review is received for the at least one content item from a second wireless device corresponding to the second user identification; and
   a second addition operation comprising adding a second point value to the relevance weight value associated with the at least one content item when a negative review is received for the at least one content item from the second wireless device corresponding to the second user identification.

5. The system of claim 4, wherein the relevance weight adjustment module is further configured to perform a third subtraction operation comprising subtracting a third point value from the relevance weight value associated with the at least one content item when the at least one content item is delivered in excess of a predetermined number of times.

6. The system of claim 1, wherein the relevance weight adjustment module is further configured to log a relevance weight value in association with a time.

7. A system for adjusting a relevance weight value for a content item, comprising:
   a network communicatively coupled to at least one access point;
   a wireless device corresponding to a first user identification;
   a remote server including a processor, the processor having at least a relevance engine database stored thereon, the relevance engine database including a plurality of user profiles, each user profile comprising a user identification, wherein the remote server is communicatively coupled to the network;
   each user identification associated with at least one attribute group, wherein the first user identification and a second user identification are associated with a first attribute group;
   a plurality of content items, wherein each of the plurality of content items includes an associated location;
   an initial relevance weight value corresponding to an association between the first attribute group and each content item, wherein each content item includes a rank relative to the plurality of content items corresponding to the initial relevance weight value;
   a plurality of beacons communicatively coupled to the network, wherein each beacon of the plurality of beacons is configured to forward data to at least one beacon of the plurality of beacons, wherein each beacon broadcasts a beacon signal including a radio frequency and a beacon identifier;
   a beacon signal strength associated with each beacon signal, wherein the beacon signal strength is determined by the wireless device;
   a stationary display for displaying at least one of the plurality of content items, the stationary display having a stationary display location, wherein the stationary display is communicatively coupled to the network;
   a positioning module communicatively coupled to the remote server, the positioning module configured to receive a location message from the wireless device through the access point via the network, the location message including at least one beacon identifier and associated beacon signal strength, the positioning module further configured to determine a location of the wireless device, the location associated with the at least one beacon identifier and associated beacon signal strength;
   a content delivery module communicatively coupled to the remote server, the content delivery module configured to deliver a plurality of content items associated with the stationary display location via the network when the wireless device is at the stationary display location, wherein the plurality of content items are further associated with at least one attribute group associated with the first user identification, and wherein the at least one attribute group includes the first attribute group;
   a user interface disposed on the stationary display, the user interface configured to:
      receive a feedback input associated with at least one content item; and
      transmit the feedback input to the content delivery module through the access point via the network;
   a review input disposed on the stationary display that corresponds to the feedback input; and
   a relevance weight adjustment modules operatively coupled to the content delivery module, the relevance weight adjustment module configured to adjust the initial relevance weight value corresponding to the association between the at least one content item and the first attribute group based on the feedback input, wherein the relevance weight adjustment module further adjusts the rank of the at least one content item relative to the plurality of content items.

8. The system of claim 7, wherein the content delivery module is further configured to receive a positive review input from the wireless device that corresponds to a positive feedback input and a negative review input that corresponds to a negative feedback input; and
   wherein the relevance weight adjustment module is configured to perform one of a subtraction operation and an addition operation.

9. The system of claim 8, wherein the subtraction operation comprises subtracting a first point value from the relevance weight value associated with the at least one content item when a negative review is received for the at least one content item and the addition operation comprises adding a first point value to the relevance weight value associated with the at least one content item when a positive review is received for the at least one content item.

10. The system of claim 9, wherein the relevance weight adjustment module is further configured to perform:
   a second subtraction operation comprising subtracting a second point value from the relevance weight value associated with the at least one content item when a negative review is received for the at least one content item from a second wireless device corresponding to the second user identification; and
   a second addition operation comprising adding a second point value to the relevance weight value associated with the at least one content item when a negative review is received for the at least one content item from the second wireless device corresponding to the second user identification.

11. The system of claim 10, wherein the relevance weight adjustment module is further configured to perform a third subtraction operation comprising subtracting a third point value from the relevance weight value associated with the at least one content item when the at least one content item is delivered in excess of a predetermined number of times.

12. The system of claim 7, wherein the relevance weight adjustment module is further configured to log a relevance weight value in association with a time.

13. A method for adjusting a relevance weight value for a content item, comprising:
associating, by a remote server having a processor with at least a relevance engine database stored thereon, at least one attribute group with a first user identification and a second user identification;
communicatively coupling the remote server to a network;
communicatively coupling at least one access point to the network;
associating, by the remote server, an initial relevance weight value with each content item of a plurality of content items, wherein each content item includes a rank relative to the plurality of content items, wherein the initial relevance weight value corresponds to an association between the at least one attribute group and each content item of the plurality of content items, and wherein the rank corresponds to the initial relevance weight value;
communicatively coupling each of a plurality of beacons to the network, wherein each beacon of the plurality of beacons is configured to forward data to at least one of the plurality of beacons, and wherein each beacon of the plurality of beacons is associated with a unique beacon identifier;
broadcasting, by each of the plurality of beacons, a beacon signal including a radio frequency and a beacon identifier;
enabling a wireless device to determine a received beacon signal strength associated with each beacon signal detected by the wireless device, wherein the wireless device corresponds to the first user identification;
receiving, by a positioning module configured to determine a location of the wireless device, at least one beacon identifier and associated beacon signal strength from the wireless device;
delivering a subset of the plurality of content items to the wireless device through the access point via a network communicatively coupled to the remote server, wherein the subset of content items are each associated with the location of the wireless device, and wherein the subset of content items are further associated with the at least one attribute group associated with the first user identification;
displaying at least one of the subset of content items on the wireless device;
receiving with a user interface disposed on the wireless device a feedback input associated with at least one content item of the subset of content items; and
transmitting the feedback input to the content delivery module through the access point via the network, wherein the feedback input comprises a review input received from the wireless device; and
performing an adjustment operation with a relevance weight adjustment module operatively coupled to the content delivery module, wherein the adjustment operation comprises adjusting the initial relevance weight value corresponding to the association between the at least one content item and the at least one attribute group based on the feedback input, and adjusting the rank of the at least one content item relative to the plurality of content items.

14. The method of claim 13, wherein the adjustment operation further includes one of a subtraction operation and an addition operation, wherein the subtraction operation comprises subtracting a first point value from the relevance weight value associated with each attribute group associated with the user identification when a negative review is received for the at least one content item, and wherein the addition operation comprises adding a first point value to the relevance weight value associated with each attribute group associated with the user identification when a positive review is received for the at least one content item.

15. The method of claim 14, wherein the relevance weight adjustment module is further configured to perform:
a second subtraction operation comprising subtracting a second point value from the relevance weight value associated with the at least one content item when a negative review is received; and
a second addition operation comprising adding a second point value to the relevance weight value associated with the at least one content item when a negative review is received.

16. The method of claim 15, wherein the relevance weight adjustment module is further configured to perform a third subtraction operation comprising subtracting a third point value from the relevance weight value associated with the at least one content item when the at least one content item is delivered in excess of a predetermined number of times.

17. The method of claim 13, wherein the relevance weight adjustment module is further configured to log a relevance weight value in association with a time.

* * * * *